No. 635,501. Patented Oct. 24, 1899.
J. J. A. MORATH.
AGRICULTURAL MACHINE.
(Application filed May 18, 1899.)
(No Model.) 4 Sheets—Sheet 1.
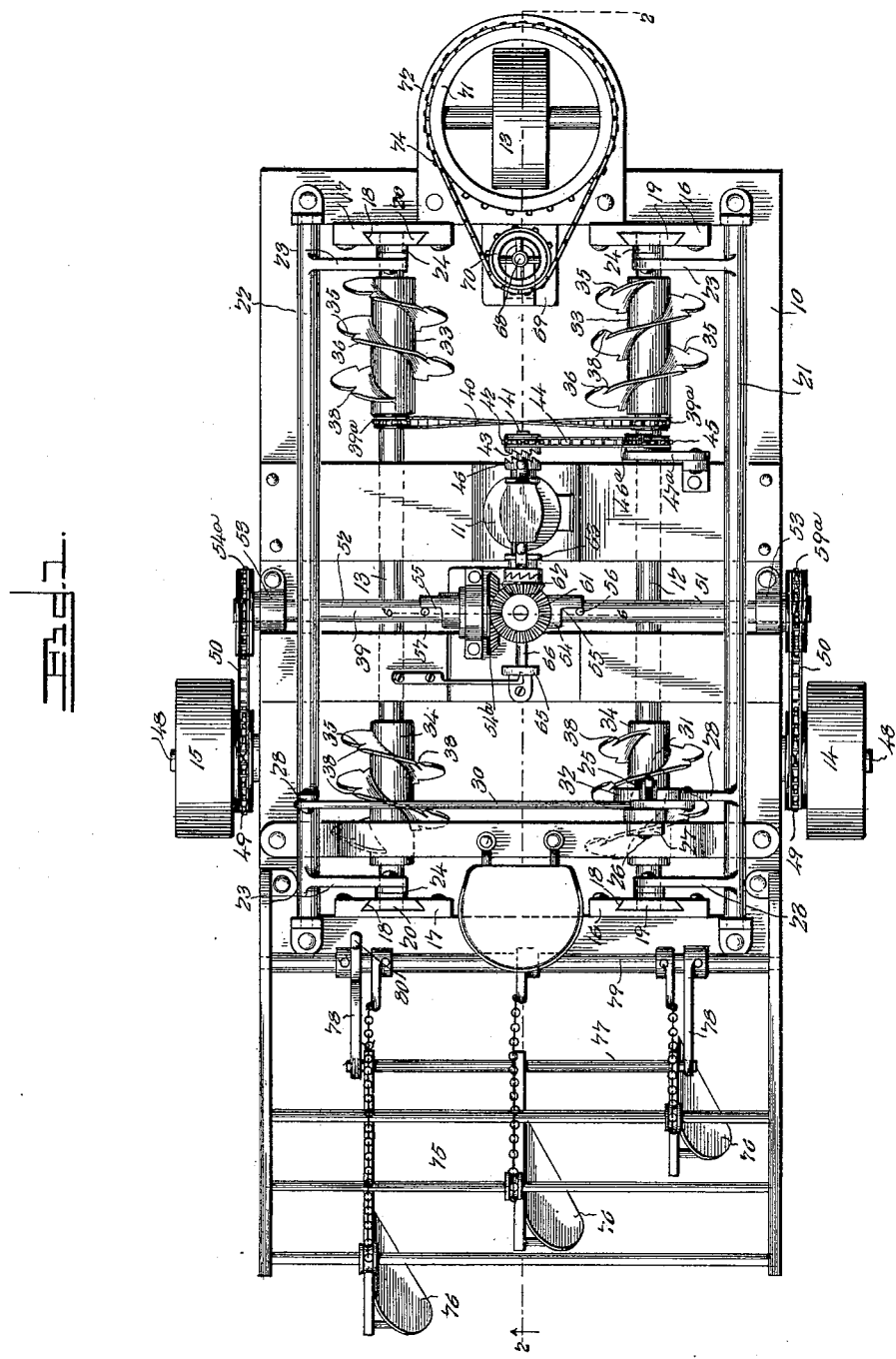
Witnesses
E. F. Stewart
H. J. Bernhard
Jacob J. A. Morath Inventor
By his Attorneys,
C. A. Snow & Co.

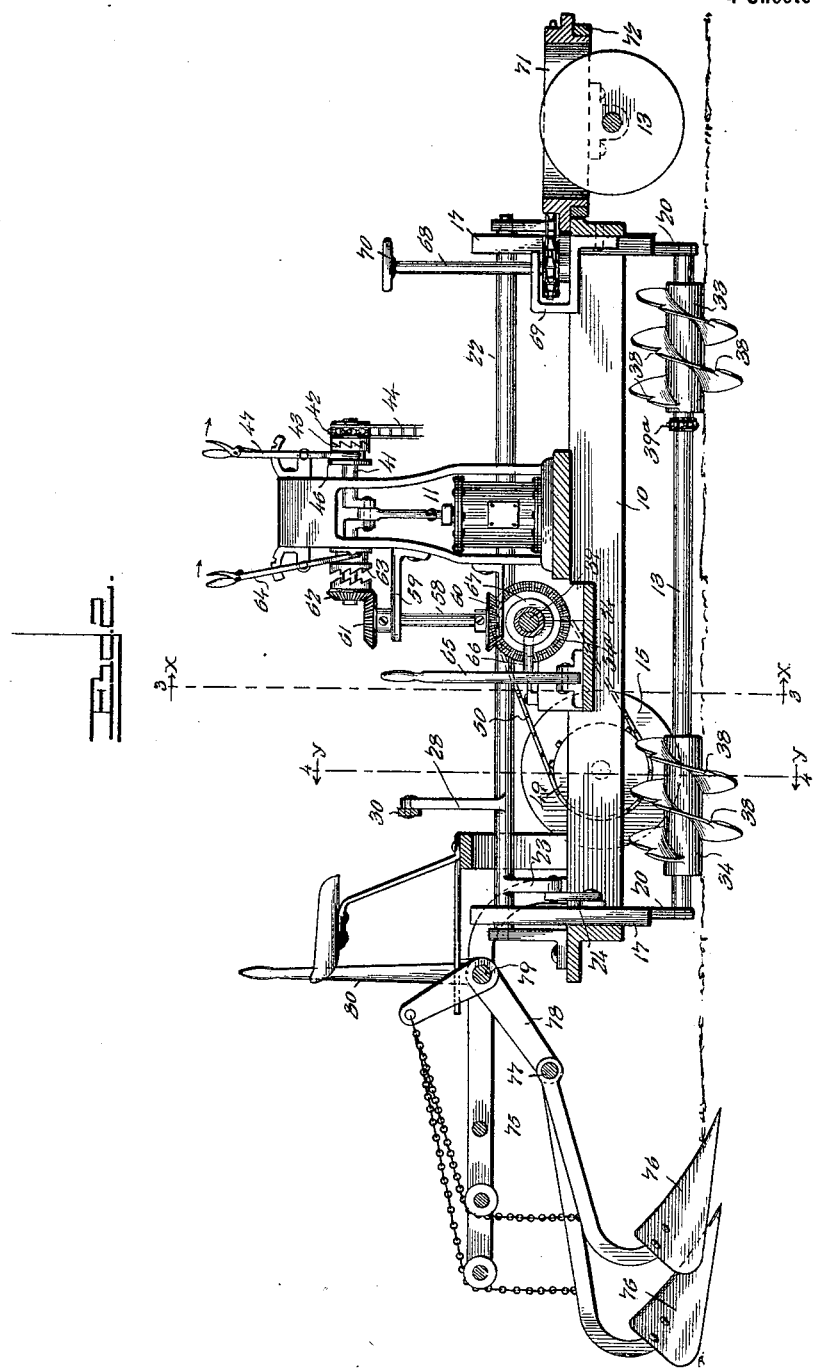

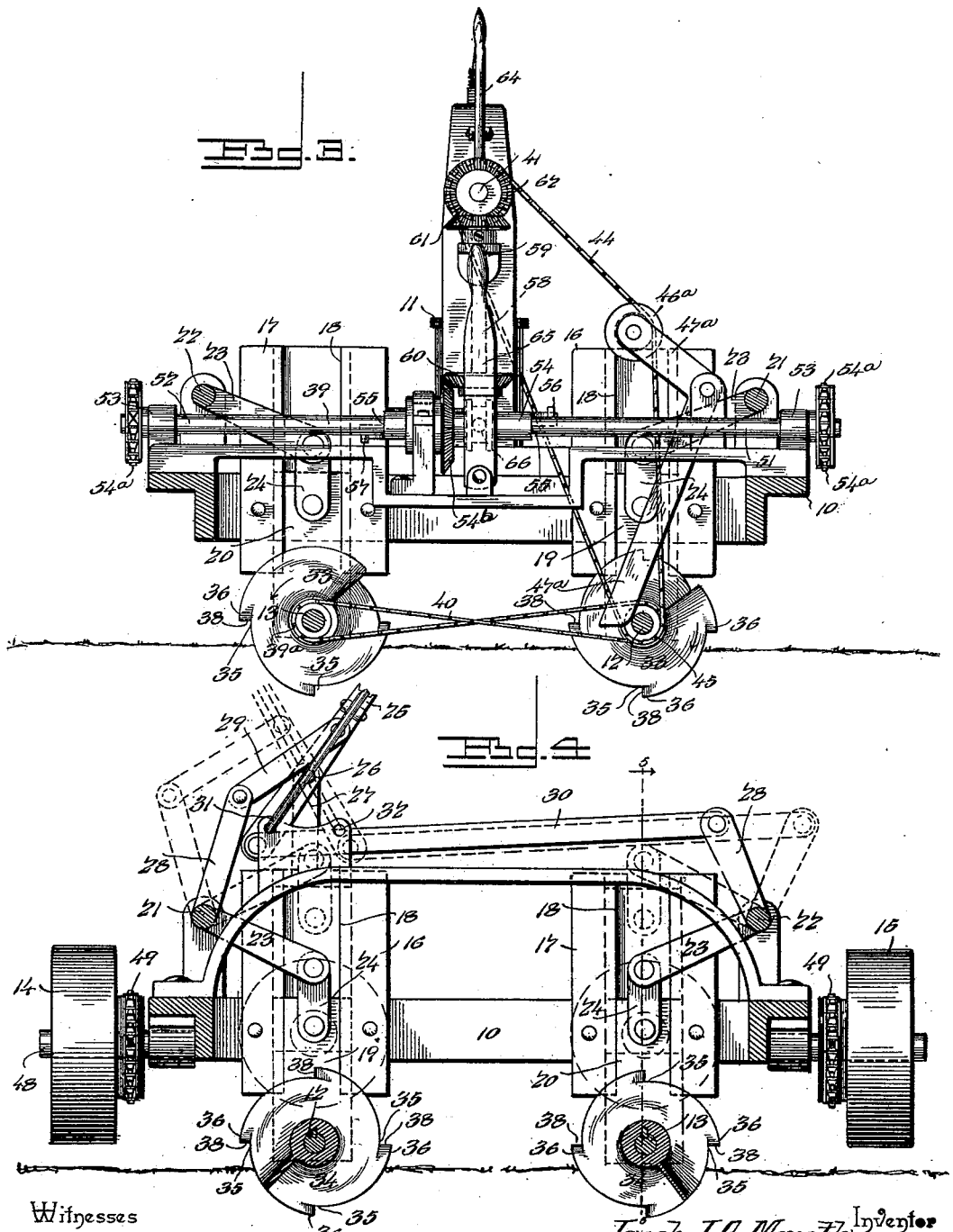

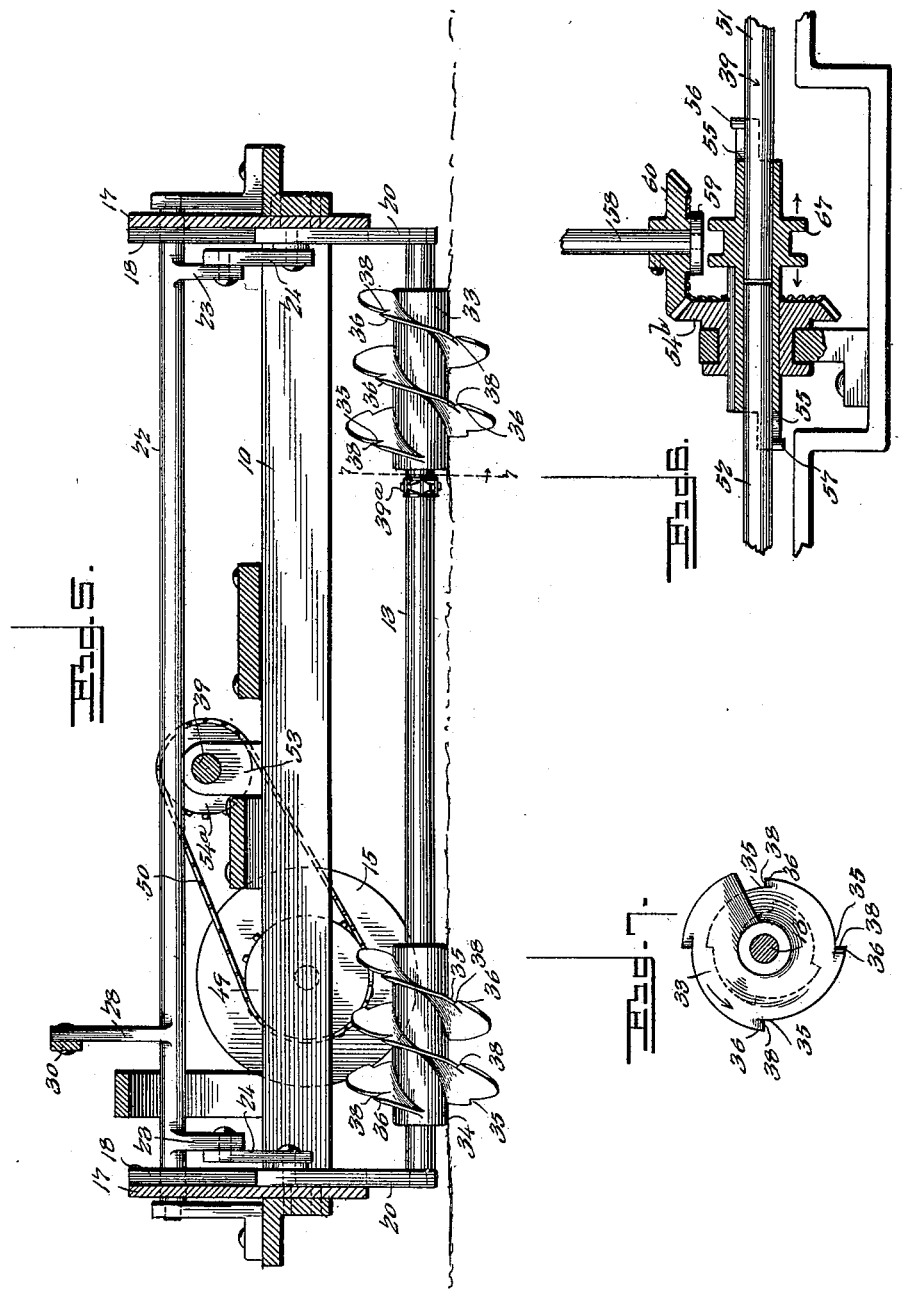

UNITED STATES PATENT OFFICE.

JACOB J. A. MORATH, OF CLAYTON, MISSOURI.

AGRICULTURAL MACHINE.

SPECIFICATION forming part of Letters Patent No. 635,501, dated October 24, 1899.

Application filed May 18, 1899. Serial No. 717,357. (No model.)

*To all whom it may concern:*

Be it known that I, JACOB J. A. MORATH, a citizen of the United States, residing at Clayton, in the county of St. Louis and State of Missouri, have invented a new and useful Agricultural Machine, of which the following is a specification.

My invention relates to improvements in agricultural machines for performing the necessary farmwork, such as plowing and harrowing the ground, planting the seed, and for various other kinds of work necessary to be done on the farm.

One object that I have in view is to provide a comparatively simple and compact apparatus in which is embraced a propulsion mechanism adapted to penetrate the ground and to plow its way therethrough for the propulsion of the machine, such propulsion mechanism having cutting edges which sever the roots of vegetable growths on the land. With such propulsion mechanism is associated means for giving vertical adjustment thereto in order to move such mechanism into or out of operative positions.

A further object is to provide traction devices adapted to transport the machine over the field or road when the propulsion mechanism is out of service, and such traction devices are adapted to be driven in a manner to propel the machine in a straight course or to assist in steering the machine around curves or bends in a road.

With these ends in view the invention consists in the novel combinations of mechanisms and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a plan view of an agricultural machine constructed in accordance with my invention. Fig. 2 is a vertical longitudinal sectional elevation taken centrally through the machine and on the plane indicated by the dotted line 2 2 of Fig. 1. Fig. 3 is a vertical transverse sectional elevation on a plane at one side of the engine or motor and on the dotted line 3 3 of Fig. 2, looking in the direction indicated by the arrow X. Fig. 4 is another vertical transverse section, taken in the plane indicated by the dotted line 4 4 of Fig. 2 and looking in the direction indicated by the arrow Y. Fig. 5 is a longitudinal detail sectional view through the machine in the plane indicated by the dotted line 5 5 of Fig. 4 to more clearly illustrate one of the propelling-shafts and the devices which adjustably support said shaft in the main carrying-frame of the machine. Fig. 6 is an enlarged detail sectional view through a part of the driving mechanism for the traction-wheels, the plane of the section being indicated by the dotted line 6 6 of Fig. 1. Fig. 7 is a detail cross-sectional view through one of the propelling-shafts in the plane indicated by the dotted line 7 7 of Fig. 5 to show the peculiar construction of the notched edges on the spiral auger or screw by which the propulsion mechanism is adapted to plow its way through the ground and to sever the roots of vegetable growths in the path of the auger.

The same numerals of reference are used to indicate like and corresponding parts in each of the several figures of the drawings.

In carrying my invention into practice I employ a main carrying-frame 10, which supports the engine or motor 11, from which the power is taken for the operation of the propelling-shafts 12 13 or the traction-wheels 14 15.

The machine of my invention is equipped with two sets of propulsion devices, one of which is embodied in the form of screw-equipped shafts 12 13, that are adapted to be lowered into the ground and which are positively driven in opposite directions for the purpose of plowing their way through the soil when the machine is to be used for different kinds of work on the farm; but this screw-propulsion mechanism is adapted to be lifted out of operative position in transporting the machine from one field to another or along a highway. In this last-described adaptation of the machine the traction devices are brought into service for the propulsion of the machine by the engine or motor without permitting the screw-shafts to come into engagement with the ground, and such traction devices are adapted for control and operation in a manner to assist in steering the machine around a curve or bend in the road, as will hereinafter more fully appear.

The propulsion-shafts 12 13 are arranged longitudinally of the main frame 10 and on opposite sides of the middle thereof, and said propelling-shafts are mounted for rotary movement in vertically-adjustable bearings which are connected slidably to the frame and are adapted to be raised and lowered for the purpose of moving the propelling-shafts into and out of operative positions. The main frame 10 is equipped at its opposite ends with posts 16 17, which are arranged in bearings on opposite sides of the median line of the frame, and the two posts constituting each pair are in the same vertical plane for the accommodation of the pair of bearings that support one of the propelling-shafts. Said posts are provided on their opposing faces with vertical guideways 18, and in one pair of these posts are slidably fitted the bearings 19, which support the propelling-shaft 12, while the other pair of posts receive the pair of bearings 20, that support the other propelling-shaft 13. It will be noted that each shaft is journaled in its bearings to rotate freely therein and that the shaft is adapted to travel with the bearings in a vertical direction for the purpose described.

I equip the machine with means by which the propelling-shafts and their bearings may be adjusted simultaneously and to an equal extent, so that the two shafts may be jointly raised out of working position or they may be lowered for the same distance in order that the augers or screws on said shafts may uniformly penetrate the soil. In one embodiment of the adjusting mechanism I employ the rock-shafts 21 22, which are disposed longitudinally of the frame on opposite sides of the engine and are mounted in proper bearings, which are supported by the frame 10. These rock-shafts are provided with the inwardly-extending crank-arms 23, to which are pivoted the links 24, having their opposite ends connected pivotally to the bearings 19 20 for the propelling-shafts, and these rock-shafts are adapted to be operated from a single adjusting-lever in a manner to simultaneously rock the two shafts in opposite directions in order to lower or raise the bearings for the propelling-shafts. This adjusting-lever 25 is fulcrumed at a point intermediate its length, as at 26, to a stand or post 27, and the rock-shafts 21 22 are furthermore provided with crank-arms 28, the crank 28 on each rock-shaft being disposed substantially at right angles to the crank 23 on the same shaft. The crank-arms 28 of the two rock-shafts are connected operatively with the adjusting-lever 25 by means of links 29 30, each of which is pivoted to one of the crank-arms 28, and the link 29 is pivoted to the lever 25 at a point above its fulcrum 26, while the other link 30 is pivoted to said lever below its fulcrum 26, whereby a movement of the lever in one direction will operate the links 29 30 and the crank-arms 28 to rock the shafts simultaneously in opposite directions. With the adjusting-lever 25 is associated suitable means for locking the lever in place and through the train of connections maintain the propelling-shafts in their raised or lowered positions. Any suitable form of detent device may be employed for holding the lever in its adjusted position; but in the construction shown by the drawings the detent 31 is in the form of a latch which is adapted to engage with a rack or segment 32, although it will be understood that I do not restrict myself to this particular locking device.

Each propelling-shaft is provided with the front and rear screws or augers 33 34, which are disposed in line with each other at or near opposite ends of the shaft, and as my machine is equipped with two of the propelling-shafts and as each shaft has augers near the respective ends thereof it will be seen that a series of four augers are provided for entering the ground in order to have the necessary frictional engagement therewith when the screw-propulsion mechanism is in use. Each auger or screw consists of a continuous spiral blade which gradually increases in diameter from the front end to the heel or rear end thereof, thus making the auger or screw of expanded or approximately conical form. The spiral blade constituting the auger or screw is provided at intervals with notches 35 in the outer edge thereof, and this notched construction on the edge of the blade forms a series of shoulders 36. The shouldered edge of the spiral blade is fashioned to form cutting edges 38, and this is attained by beveling the shoulders 36 on opposite sides in order to produce the sharp edges which will sever the roots of vegetable growths encountered by the auger as it plows a path through the soil.

By the disposition of the propulsion-shafts and the augers or screws on opposite sides of the median line of the machine I find it necessary to provide means for simultaneously driving the two shafts in opposite directions, so that the machine will be propelled in a straight course when the screw-propulsion mechanism is in service, and hence I contemplate gearing the two shafts 39 together for simultaneous rotation in opposite directions. Any suitable type of gearing may be adopted for the reverse rotation of the shafts; but in the construction herein shown I equip the shafts 12 13 with sprocket-gears $39^a$, which are connected operatively by a crossed sprocket-chain 40. It is evident, however, that other types of gearing may be adopted—as, for instance, belt-and-pulley gears or spur-gears; but to secure the desired efficiency I prefer to use the sprocket-gearing represented more clearly by Fig. 3.

It will be understood that the motor or engine 11 is designed to furnish the power for the operation of the screw-propulsion mechanism and for the traction-wheels 14 15, and in this connection it is desired to state that independent clutch-controlled devices are provided from the engine to the screw-propulsion mechanism and to the traction-wheels for rotating the two mechanisms independently. The engine or motor may be of any suitable type—that is to say, I may employ a steam-engine or a gas-engine to be operated by expansive motive fluid the generator for which is adapted to be carried on the apparatus; but the type of engine is not material, because I may also equip the apparatus with an electric motor the energy for which may be stored in electric accumulators or be supplied to the motor in any suitable manner. The engine represented by Figs. 1 and 2 is a steam-engine of peculiar construction mounted upon the main frame 10 at the middle thereof, and the shaft 41 of this engine is extended or prolonged at both ends beyond the engine-frame. One end of this engine-shaft is equipped with a sprocket-gear 42, which is loosely fitted on the shaft and which is provided with a clutch-face 43, and around this clutch-formed sprocket 42 is passed an endless sprocket-chain 44, that also engages with a sprocket-gear 45 on one of the propelling-shafts, preferably the shaft 12. The engine-shaft 41 has a slidable clutch 46 keyed thereto in a position to engage with the clutch-face 43 of the sprocket-gear, and with this clutch is engaged a shipping-lever 47, that is adapted to adjust the clutch into and out of engagement with the clutch-face of the gear 42. It will be noted that the clutch may be shifted into engagement with the gear 42 to make the latter fast with the engine-shaft, and this gear will therefore propel the chain 44 to drive the propelling-shaft 12. The propelling-shaft is thus rotated in its bearings, and as the two propelling-shafts are connected operatively together it follows that the shafts 12 13 will rotate simultaneously in opposite directions by the power derived from the engine-shaft 41.

In view of the fact that the propelling-shafts are mounted for vertical adjustment in order to throw the same into and out of service and the further fact that one propelling-shaft is connected by sprocket-gearing with the engine-shaft to be driven positively thereby it is necessary to provide a permanent allowance of abundant slack in the sprocket-chain 44 to permit the desired adjustment of the propelling-shafts. To take up this slack in the sprocket-chain 44 and insure the transmission of motion from the engine-shaft to the propelling-shaft, I contemplate the employment of a belt-tightening device which is operative in unison with the adjustment of the propelling-shaft. This belt-tightening device consists of a roller 46$^a$, arranged to travel against one strand of the chain belt 44 and a doubled-armed or bell-crank lever 47$^a$, which is fulcrumed on a suitable part of the frame and which has the roller 46$^a$ loosely journaled on one arm thereof. This lever is arranged in a position for its free arm to engage with the propelling-shaft 12, and when this shaft is raised it operates to shift the position of the bell-crank lever in a direction for the roller 46$^a$ to bear against the chain belt 44 in a direction to take up the slack. In like manner the bell-crank lever 47$^a$ is shifted by engagement of the chain belt 44 with the roller 46$^a$, and thus the lever is held in position for its roller to strain the chain belt 44 when its shaft 12 is lowered in order that the slack in the chain belt may be taken up so as to maintain said chain belt in a taut condition, which will insure the transmission of the energy from the engine-shaft to the propelling-shaft 12, said belt-tightener being shiftable automatically with the changes in the position of the propelling-shafts.

I will now proceed to describe the means for transmitting the engine-power to the traction-wheels 14 15. These traction-wheels are disposed on opposite sides of the frame near the rear part thereof, and said wheels are journaled idly on the stub-axles 48, which are fixed to the main frame 10 in any suitable way. The sprocket-gears 49 are made fast with the traction-wheels, and around said sprocket-gears are passed the endless sprocket-chains 50.

For the simultaneous or independent operation of the chains 50 to properly rotate the traction-wheels 14 15 as may be required in the practical service of the apparatus, I employ a divided shaft which is arranged transversely on the machine-frame 10. The members of this divided transverse shaft are indicated by the numerals 51 52 in Figs. 1 and 6 of the drawings, and said shaft members are disposed in alinement with each other in order that they may be mounted in proper bearings 53 on the main-frame 10. The ends of the divided shaft are prolonged or extended beyond the sides of the frame for the reception of sprocket-gears 54$^a$, around which pass the sprocket-chains 50, and when the shaft is driven the gearing 50 49 transmit the motion of the shaft to the wheels 14 15. A tubular shaft 54 is fitted loosely on the inner contiguous ends of the parts 51 52, which form the divided shaft, and this tubular shaft is adapted to be positively driven by connections with the engine-shaft and is mounted to have fast engagement with either member of the shaft or with both members of said shaft. The ends of the tubular shaft 54 are provided with notches 55, and to the members of the dividing shaft are fixed the studs 56 57, which are adapted to be engaged jointly or severally with the notched ends of the shiftable shaft 54. This tubular shaft may be adjusted endwise on the members of the divided shaft by means of a shipping-lever 65, which is fulcrumed at a suitable point on the main frame, and said lever has a finger or arm 66, which engages loosely in the groove or collar 67, which is fast with the tubular shaft 54. By moving the lever 65 in one direction the finger is made to move the collar 67 and shaft 54 in a corresponding direction for one notched end of the shaft 54 to engage with a stud 56 on the member 51 of the divided shaft, whereby the motion of the shaft 54 may be communicated to the shaft member to propel one traction-wheel without affecting the other shaft member 52 or the traction-wheel 15. The lever 65 may, however, be adjusted in the reverse direction for the other notched end of the shaft 54 to engage with the stud 57 on the member 52 of the divided shaft, and thus the shaft member 52 and the traction-wheel 15 may be driven from the tubular shaft 54 without affecting the shaft member 51 or the traction-wheel 14. At the same time the lever 65 may occupy a position midway between either of the positions heretofore described, and thus the notched ends of the shaft 54 may engage with the studs 56 57 on the two members of the divided shaft, and thus the shaft may propel the traction-wheels 14 15 in order to drive the apparatus in a straight course over a road or field when the screw-propulsion mechanism is thrown out of service. It will therefore be understood that either traction-wheel may be positively driven in order to assist in steering the machine to the right or left from a straight course; but the driving mechanism may be adjusted for the two wheels to rotate simultaneously to propel the machine in a straight line.

The tubular shaft 54 is provided with a beveled gear 54$^b$, with which meshes a bevel-gear 60, which is fast with the lower end of the vertical shaft 58, said shaft being journaled in proper bearings 59 to occupy a position immediately below one end of the engine-shaft 41. To the upper end of said vertical shaft is secured a bevel-gear 61, arranged to mesh with a clutch-formed gear 62, which is mounted idly on the engine-shaft 41, and with this clutch-formed gear 62 is adapted to engage a slidable clutch 63, which is keyed on the engine-shaft and is shifted thereon by means of a shipping-lever 64. This lever may be adjusted into engagement with the clutch-gear 62 for making the latter fast with the engine-shaft, so that the gears 62 60 may transmit the motion of the engine-shaft to the vertical shaft, which in turn drives the tubular shaft 54, adapted, as hereinafter described, to jointly or severally drive the divided shaft 51 52; but it is evident that the lever may be reversed to release the clutch from the gear 62, thus permitting the driving mechanism for the traction-wheels to remain idle. In this connection it is desired to state that the driving mechanism for the screw-propulsion mechanism is operative independently of the driving mechanism for the traction-wheels, and thus either the screw-propulsion mechanism or the traction devices may be thrown into or out of operative relation with respect to the engine or motor shaft.

The apparatus is steered by means of a steering-spindle 68, which is mounted in a proper bearing 69 at the front end of the main frame 10, and on the upper end of this steering-spindle is secured a hand-wheel 70, which provides for the convenient adjustment of said spindle. A turn-table 71 is supported in the bearing-plate 72, which is fixed to the front end of the frame 10 at the middle thereof, and this turn-table carries a steering-wheel 13, the axle of which is journaled in proper bearings on the lower side of the turn-table. The steering-spindle and turn-table are connected operatively by intermediate gearing of any suitable type, (indicated at 74,) and thus the motion of the steering-spindle may be transmitted to the turn-table to deflect the position of the steering-wheel with relation to the axial line of the machine.

My apparatus as herein constructed is adapted for the performance of useful work on a farm, and said apparatus is designed to support or draw the mechanism which may be used for treating the soil either for plowing, harrowing, or seeding purposes. In Figs. 1 and 2 the machine is shown as provided at its rear end with a plow-carrying frame 75, which is firmly and detachably secured to the main frame 10. The gang of plows 76 are attached to a suspending shaft 77, which is mounted in arms 78 on a rock-shaft 79, and with this rock-shaft is associated a lever mechanism 80, by which the plows may be raised or lowered, as desired. The plowing mechanism is mounted on the frame 75, which is detachably secured to the main frame 10; but it is evident that the plow-frame may be removed bodily from the apparatus when it is desired to attach a harrow to the machine. I do not limit myself, however, to the employment of any particular earth-treating mechanism in connection with my apparatus, because a seeding-machine may be hitched to the rear end of the frame 10; but in lieu of the seeding-machine any other agricultural implement may be mounted on or connected to the frame 10 of my apparatus for the performance of useful work on a farm.

Changes in the form, proportion, size, and the minor details of construction within the scope of the appended claims may be resorted to without departing from the spirit or sacrificing any of the advantages of this invention.

Having thus described the invention, what I claim is—

1. In an agricultural machine, the parallel horizontal shafts, means for rotating said shafts in opposite directions, and the screws secured in pairs on shafts and arranged in corresponding positions, the helices of corresponding screws being inclined in opposite directions, combined with a frame, a motor, and means for raising said shafts and screws, substantially as described.

2. In an agricultural machine substantially such as described, the propelling-shafts provided with screws or augers adapted to plow through the ground, a frame, independent pairs of bearings slidably mounted on said frame and each pair of alined bearings carrying the propelling-shafts, and a lever having operative connections with said pairs of slidable bearings to raise and lower the propelling-shafts into or out of operative positions, in combination with a motor or engine, and a driving mechanism between said propelling-shafts and the motor or engine, as set forth.

3. In an agricultural machine, the parallel horizontal shafts, the screws secured in corresponding positions on the shafts and arranged for the screw-helices on one shaft to be inclined reversely to the screw-helices on the other shaft, each screw having helices of uniform width and formed with a plurality of cutting edges, and means for rotating the shafts in opposite directions, substantially as described.

4. In an agricultural machine, a frame, vertical guideways on said frame, slidable bearings fitted in said guideways, and propelling-shafts mounted in said bearings and provided with screws or augers, in combination with a motor or engine, and a driving mechanism connecting said propelling-shafts with the motor or engine, substantially as described.

5. In an agricultural machine, the combination with a frame and a motor or engine, of propelling-shafts mounted in said frame on opposite sides of the median line thereof and provided with a series of screws or augers arranged near the front and rear ends thereof, means for raising and lowering said propelling-shafts, and a driving mechanism between the propelling-shafts and the motor or engine for positively rotating the shafts when lowered into operative positions, substantially as described.

6. In an agricultural machine, the combination of a frame provided with guideways, propelling-shafts mounted in bearings which are fitted slidably in said guideways, rock-shafts having link connections with the bearings of the propelling-shafts, a lever connected with said rock-shafts to simultaneously actuate the same, a motor or engine, and a driving mechanism for positively rotating the propelling-shafts in opposite directions, substantially as described.

7. In an agricultural machine, the combination with a frame, a motor or engine and traction-wheels, a shiftable shaft adapted to be made fast with either or both members of the divided shaft, and means between the engine and the tubular shaft for rotating the latter, substantially as described.

8. In an agricultural machine, the combination with a frame, a motor or engine, and independent traction-wheels, of a divided shaft having its members geared individually to the respective traction-wheels, a tubular shaft with clutch devices for making the same fast with either or both members of the divided shaft, and a counter-shaft driven from the engine or motor and connected operatively with the tubular shaft, substantially as described.

9. In an agricultural machine, the combination with independent traction-wheels, a divided shaft having its members geared individually to the respective traction-wheels, a tubular shaft fitted slidably to the divided shaft and coacting with clutch devices for making said tubular shaft fast with either or both members of said divided shaft, a lever for shifting the tubular shaft, an engine or motor, and a counter-shaft driven by said engine and geared to the tubular shaft to rotate the latter, substantially as described.

In testimony that I claim the foregoing as my own I have hereto affixed my signature in the presence of two witnesses.

JACOB J. A. MORATH.

Witnesses:
SIMON WOLF,
E. E. VROOMAN.